Figure 1:
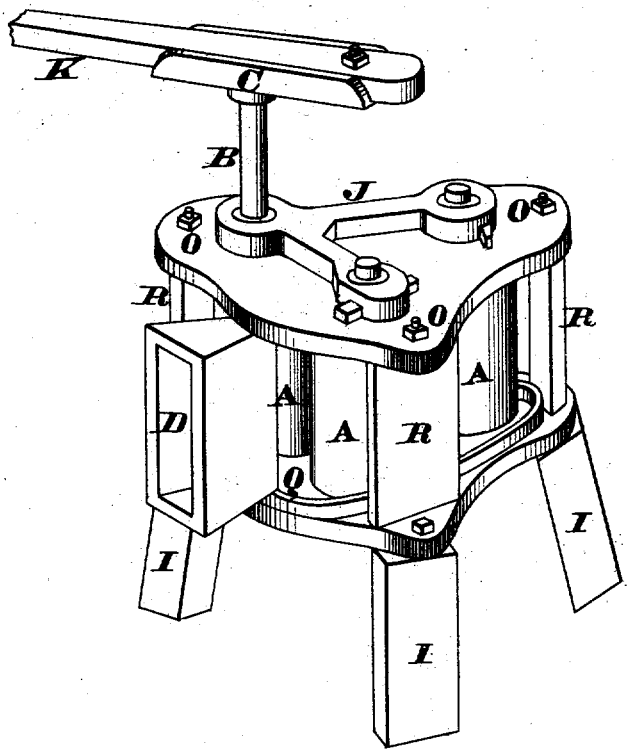

2 Sheets—Sheet 1.

I. A. HEDGES.

Assignor, by mesne assignments, to the BLYMYER MANUFACTURING COMPANY.

Mill for Grinding Cane.

No. 7,989. Reissued Dec. 11, 1877.

Attest.
Jeremiah F. Lovbig.
Ernest H. Rybub

Inventor.
Isaac A. Hedges by Arthur Steel
his Att'ys.

N. PETERS, PHOTO-LITHOGRAPHER, WASHINGTON, D. C.

2 Sheets—Sheet 2.

I. A. HEDGES.

Assignor, by mesne assignments, to the BLYMYER MANUFACTURING COMPANY.

Mill for Grinding Cane.

No. 7,989. Reissued Dec. 11, 1877.

Attest.
Jeremiah F. Twohig.
Ernest H. Ryder

Inventor.
Isaac A. Hedges, by
Arthur Steere
his Att'ys.

N. PETERS, PHOTO-LITHOGRAPHER, WASHINGTON, D. C.

UNITED STATES PATENT OFFICE.

ISAAC A. HEDGES, OF ST. LOUIS, MISSOURI, ASSIGNOR, BY MESNE ASSIGNMENTS, TO THE BLYMYER MANUFACTURING COMPANY.

IMPROVEMENT IN MILLS FOR GRINDING CANE.

Specification forming part of Letters Patent No. 22,802, dated February 1, 1859; extended seven years; Reissue No. 7,989, dated December 11, 1877; application filed November 15, 1877.

*To all whom it may concern:*

Be it known that I, ISAAC A. HEDGES, of St. Louis, county of St. Louis, in the State of Missouri, have invented certain new and useful Improvements in Mills for Grinding and Expressing Cane; and I do hereby declare that the following is a full and exact description of the same, reference being had to the accompanying drawings and letterings thereon, making a part of this specification.

The mill is provided with a feed-roller, crushing-roller, and delivery-roller, all vertical, and triangularly arranged between an upper and lower housing.

I surround the openings for the roller or cylinder shafts in the lower plates with annular ledges or equivalent device, so constructed as to effectively separate the cane-juice from the oil used to lubricate the cylinder-shaft. In the lower ends of the rollers I have shown recesses corresponding to the annular ledges, and in which the ledges fit. The object of this construction is to prevent the cane-juice from becoming wasted by washing and dripping out through the opening for the cylinder-shaft, as well as to confine the oil used as a lubricant, and prevent it from spreading, by the revolution of the cylinders beyond their peripheries, and becoming united with the cane-juice, injuring and discoloring it.

In the upper end of the rolls I provide an annular recess, into which corresponding ledges on the bottom side of the upper plate may fit. These ledges surround the shaft-bearings, and, together with the recesses, serve to prevent the oil from spreading along the lower surface of the plate to a point outside the area of the rollers, where it may come in contact with the cane. The recesses in the upper end of the rolls serve, also, separately, to perform the object of acting as receptacles to catch the oil that escapes from the bearings. They may also conduct it to openings or tubes connecting with the lower journals, so that the lower journals may thus be easily lubricated from above.

Around or next the outer edge of the lower housing I construct a flange or ledge, which prevents the juice from escaping over its edge. This housing is thus made a receptacle, in which the juice is collected to be conveyed off through a spout or suitable opening for that purpose.

I provide, in combination with the feed and crushing roller, a regulator and adjuster, being an oblong throat, extending longitudinally with said rollers, and of a width just sufficient to accommodate as much cane as should be permitted to be fed to the rollers at one time. This device is designed to adjust the cane, as it is fed through it, to the mill in a vertical array or series of stalks, evenly distributed along the crushing-roller, preventing the admission of a quantity sufficient to clog or to endanger the mill, and securing, by an even distribution of the cane, the uniform action of the rollers and an even pressure upon all the substance passing through them. This regulator or adjuster may be used, in connection with a table of suitable height and length, to support the outer ends of the stalks while they are being carried through the regulator to the mill. In case the quantity presented to the rollers should at any time become greater than can be readily drawn through the regulator, some stalks will be broken off, and the cane reduced to the proper quantity.

In order to admit of lubricating the lower journals and gearing of the mill without removing the rollers, I provide tubes or openings, communicating between the upper end of the rollers and the journals and gearing below. I am thus enabled to lubricate, with little trouble, the remoter parts of the mill, which would otherwise be difficult of access.

In order to convert the mill into a corrugated mill, I construct a pair of corrugated cylindrical shells or sleeves, of such internal and external dimensions in reference to the diameter and central distances of one pair of the crushing-rollers that they may be conveniently slipped over the latter and retained in place. The corrugated surfaces of the cylinders thus prepared match together in close proximity, and constitute, when thus arranged, a substantial, convenient, and efficient corrugated mill.

To enable persons of competent skill to make and use my invention, I proceed to describe its entire construction.

Like letters refer to like parts in all the drawings.

Figure 8:
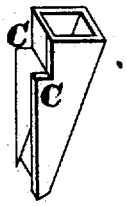
Figure 10:
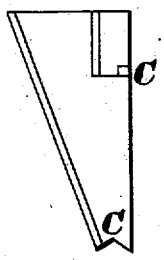
Figure 9:
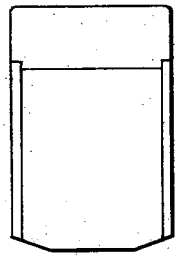
Figure 6:
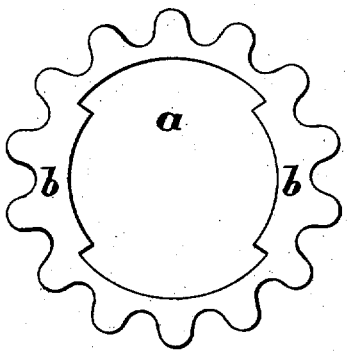
Figure 7:
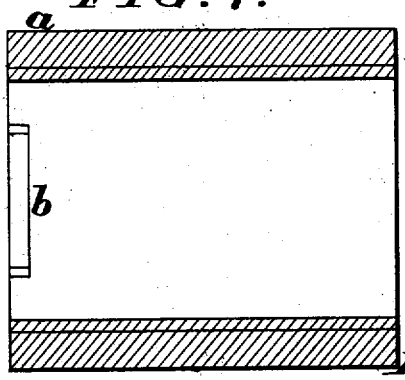
Figure 2:
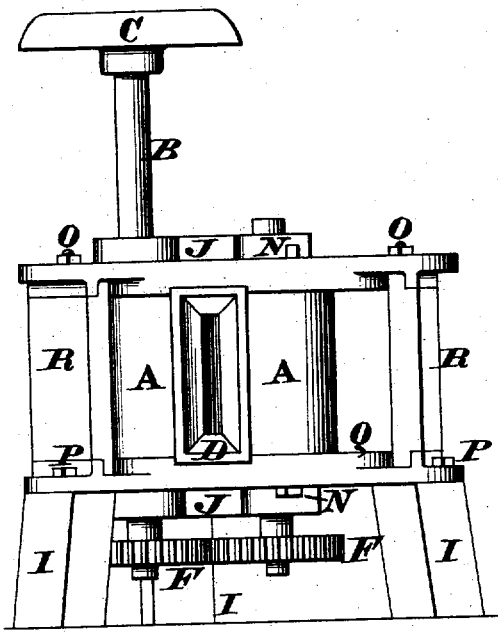
Figure 3:
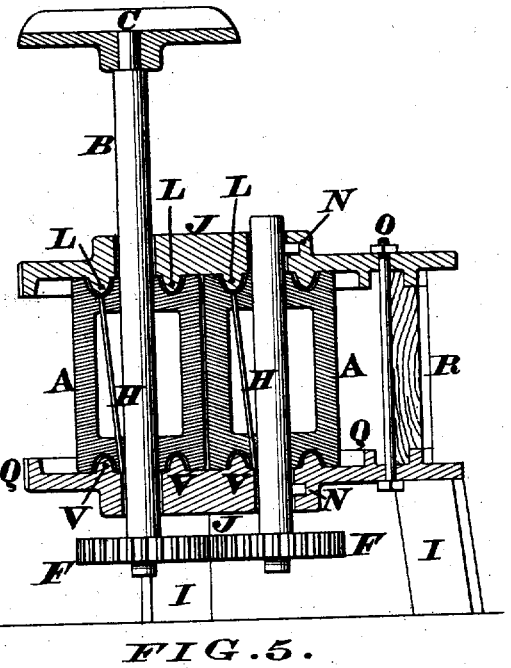
Figure 4:
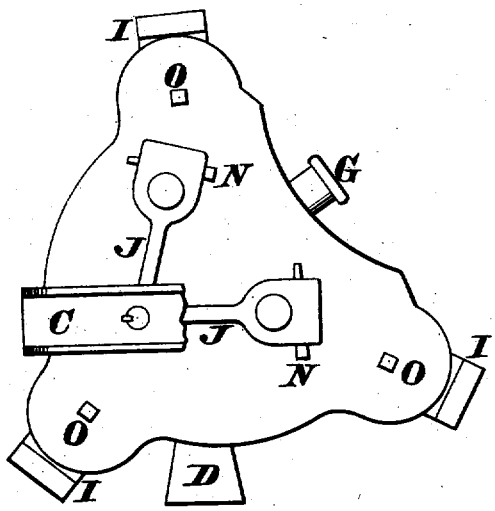
Figure 5:
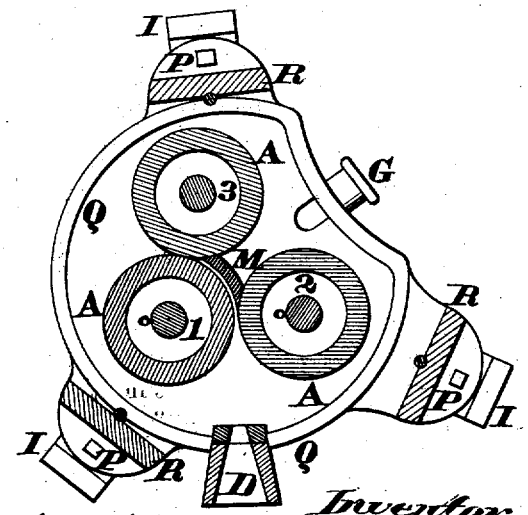

Figure 1 is a perspective view of the mill. Fig. 2 is an elevation. Fig. 3 is a vertical section, by a plane dividing the two front rollers through their axes. Fig. 4 is a plan of the top. Fig. 5 is a horizontal section. Figs. 6 and 7 are a plan and longitudinal section of the corrugated shells to adapt to the mill when required. Figs. 8, 9, and 10 are views of the hopper to be attached to the mill, as described, when used for that purpose.

A A A are rollers of any suitable length or diameter, made of cast-iron and turned. B is the main shaft. C is the flanged center, carrying the sweep. D is the regulator and adjuster. F F are the gear-wheels. G is the spout for conducting off the juice. H H are oil-tubes communicating between the upper ends of the rollers and the journals and gearing below, through which the oil passes to lubricate said lower journals and gearing. By extending these tubes or openings from the recesses in the tops of the rollers they are enabled to collect the waste oil from the upper bearings and convey it to the lower bearings. I I I are the legs or standards, made of heavy timber, to which the lower plate of the mill may be securely bolted. K is the sweep, fitted between the flanges of the center, and secured to it by one or more bolts. L and V are the ledges surrounding the openings in the top and bottom plates, respectively, and accommodated by corresponding recesses in the ends of the rollers. M is the scraper and conductor by which the partially-compressed cane is separated from the right-hand roller, and conducted around so as to enter between the main and the rear roller. These are keyed somewhat closer together than the former, and subject the cane to the final process of compressing.

N N N are keys by which the rollers are brought to any required proximity and held in place. The keys act in appropriate openings and against the backs of the bearing-boxes. O O O are bolts by which the top and bottom plates are held together. P P P are bolts by which the mill is secured firmly to the legs or standards. Q are the flanges, serving, in connection with the ledges V, to retain the juice until it may be conducted off into vessels by the spout G. R R R are frame-pieces placed between the top and bottom plates, furnishing a resistance to the action of the bolts O O O, and giving stability and stiffness to the mill.

I make the opening or throat through the regulator of cast-iron, which is secured to the main or wooden part by screws. I construct an exterior recess at top and bottom adapted to the flanges Q. The plates of the mill being bolted together, with the regulator and adjuster in its place, the flanges enter these recesses, and hold it firmly in position.

When the mill is to be used for grinding with the corrugated cylinders, the rollers are to be all removed and two of them clothed with corrugated shells. These shells fit perfectly, the lugs *b* in the ends of the shells falling into corresponding recesses in the ends of the rollers. The two rollers are then returned to the mill—the main roller to position 2, and the other roller to position of roller 3, the third roller being left out. The corrugated shells will then be found to match together. The hopper is then placed in position over the spout, when, by lugs at top and bottom, corresponding to ledges Q, and similar to the recesses in the regulator and adjuster, it is held, by closing up of the top and bottom plates, firmly in place.

Having thus fully described my mode of constructing a sugar-mill, what I claim as my invention, and desire to secure by Letters Patent, is—

1. The ledges V on the bottom plate of a vertical cane-mill, substantially as and for the purpose described.

2. The ledges L on the top plate of a vertical cane-mill, substantially as and for the purpose described.

3. The combination of the ledges V and the recesses in the lower ends of the rolls of a vertical cane-mill, substantially as and for the purposes described.

4. The annular recesses in the upper ends of the vertical rolls of the mill, to receive and collect the oil from the bearings and prevent the same from spreading, substantially as described.

5. The combination of the ledges L and the recesses in the upper ends of the rolls, substantially as and for the purpose described.

6. In combination with the vertical rollers of a cane-mill, the lower housing, so constructed as to collect the juice and discharge it through a spout or opening, substantially as described.

7. The regulator and adjuster, substantially as and for the purposes described.

8. Tubes or openings communicating through the roller with the bearings below, and enabling them to be lubricated without removing the roller, substantially as described.

9. In combination with the oil tubes or openings, the recesses in the tops of the rollers, so arranged as to collect the waste oil from the upper bearings and convey the same into said tubes or openings, substantially as described.

10. The corrugated shells, in combination with the rollers, for the purpose of readily converting the mill into a corrugated mill, constructed and adapted substantially as set forth.

11. The combination, in a cane-mill, of a feed-roller, crushing-roller, and delivery-roller, arranged vertically and in triangular form, substantially as described.

ISAAC A. HEDGES.

Witnesses:

SAML. KNIGHT,

C. W. H. BROWN.